(12) United States Patent
Job

(10) Patent No.: US 11,267,446 B2
(45) Date of Patent: Mar. 8, 2022

(54) TRAILER BRAKING SYSTEM

(71) Applicant: Richard W. Job, Ankeny, IA (US)

(72) Inventor: Richard W. Job, Ankeny, IA (US)

( * ) Notice: Subject to any disclaimer, the term of this patent is extended or adjusted under 35 U.S.C. 154(b) by 276 days.

(21) Appl. No.: 16/672,813

(22) Filed: Nov. 4, 2019

(65) Prior Publication Data
US 2021/0129809 A1 May 6, 2021

(51) Int. Cl.
*B60T 8/17* (2006.01)
*B60T 7/20* (2006.01)
*B60T 8/1761* (2006.01)
*B60T 13/66* (2006.01)

(52) U.S. Cl.
CPC ............. *B60T 8/1708* (2013.01); *B60T 7/20* (2013.01); *B60T 8/1761* (2013.01); *B60T 13/66* (2013.01)

(58) Field of Classification Search
CPC ...... B60T 8/1768; B60T 8/1761; B60T 13/66; B60T 7/20
See application file for complete search history.

(56) References Cited

U.S. PATENT DOCUMENTS

| | | | | |
|---|---|---|---|---|
| 5,283,771 A | * | 2/1994 | Kadowaki | G11B 7/131 369/103 |
| 8,930,114 B1 | * | 1/2015 | Reid | B60T 7/20 701/83 |
| 9,834,184 B2 | * | 12/2017 | Braunberger | B60T 7/20 |
| 11,097,703 B2 | * | 8/2021 | Shimizu | B60T 7/085 |
| 2008/0067862 A1 | * | 3/2008 | Parrott | B60T 8/327 303/7 |
| 2013/0255366 A1 | * | 10/2013 | Seglo | F16D 65/60 73/121 |
| 2019/0016314 A1 | * | 1/2019 | Sanders | B60T 13/662 |

* cited by examiner

Primary Examiner — Tan Q Nguyen
(74) Attorney, Agent, or Firm — Brett J. Trout

(57) ABSTRACT

A system for braking a trailer pulled by a vehicle. A trailer braking system is provided on a trailer. An electrically actuated motor drives a worm screw against a worm gear. The worm gear drives a brake actuator to push brake pads into a rotor coupled a wheel on the trailer. A wheel speed monitor reduces braking force of the trailer braking system in response to a predetermined change in wheel speed. An anti-lock braking system reduces trailer wheel skid under braking. Multiple trailer braking systems can be applied to multiple wheels on the trailer to provide more or less braking.

19 Claims, 11 Drawing Sheets

US 11,267,446 B2

TRAILER BRAKING SYSTEM

TECHNICAL FIELD

The disclosed embodiments relate generally to a trailer braking system, and, in particular, to a trailer braking system that, upon actuation of the towing vehicle brake, controls the braking of a trailer to prevent the trailer from pushing the towing vehicle under braking, while reducing skidding of the trailer's wheels and the potential for the trailer to jack-knife.

BACKGROUND

In an agricultural environment, such as a tractor pulling one or more trailers, it is desirable to provide the trailer with a separate braking system to allow the tractor trailer "train" to stop more quickly under braking. Failure to provide the trailer with a separate braking system can cause the trailer to push the tractor under braking, leading to a longer stopping distance, which can lead to collisions and/or damage to the tractor and/or trailers.

Prior art systems for providing trailers with separate braking systems are typically hydraulically or pneumatically driven. One drawback with prior art hydraulic systems is the tendency of the hydraulic lines to operate less efficiently, or not at all, in very cold weather. Since cold weather is often associated with ice on roadways, the reduced operability of hydraulic braking systems in cold weather can compromise a trailer's braking ability when it is most needed. Prior art pneumatic braking systems can also suffer from reduced functionality in colder weather if moisture gets into the system and freezes in the pneumatic lines and the mechanical components of the system. Additionally, pneumatic systems require an air compressor to pressurize the system, adding to the weight, maintenance, and cost of such systems.

Another drawback associated with prior art trailer braking systems is that such systems often require a separate hand actuator apart from the vehicle brake pedal to operate. This can be cumbersome and may lead to the trailer brake being actuated late, or not at all, in critical situations where maximum braking is required to avoid a potential accident.

Yet another drawback associated with prior art trailer braking systems is the difficulty in retrofitting such systems to existing trailers. Prior art trailer braking systems are often customized to the particular trailer, making it difficult to provide a sufficient selection of trailer braking systems to fit all existing trailers. Another drawback associated with prior art systems is the difficulty associated with powering such systems. The output from a typical seven-pin connector plug is generally insufficient to provide adequate braking for large trailers and/or large loads.

Still another drawback associated with prior art trailer braking systems is the difficulty associated with properly adjusting the amount of braking to be applied to the trailer in relationship to the amount of braking applied to the tractor. Too little braking applied to the trailer can cause the trailer to push the tractor under braking. Too much braking applied to the trailer can cause the trailer to skid under braking. While some prior art trailer braking systems are provided with adjustable braking, the difficulty associated with anticipating the exact amount of trailer braking needed for different loads often leads the trailer to brake too much or too little, even after adjustment.

SUMMARY OF THE DISCLOSED SUBJECT MATTER

To overcome the limitations in the prior art described above, and to overcome other limitations that will become apparent upon reading and understanding the present specification, the present application discloses a method, apparatus, and article of manufacture for braking a trailer. A tractor trailer brake engagement system has a motor driving a worm screw against a worm gear. The worm gear drives a brake actuator pushing on a brake pad. Actuation of the pulling vehicle brake actuates the motor of the trailer brake engagement system to drive the brake pad into engagement with a brake rotor to slow the trailer.

Multiple tractor trailer brake engagement systems can be applied to multiple wheels on the trailer to provide more or less braking. A wheel speed monitor allows the braking system to reverse the motor and allow the brake pad to pull away from the rotor, to reduce the braking force of the trailer braking system in response to a predetermined change in trailer wheel speed.

Other implementations of trailer braking systems are disclosed, including implementations directed to powered and self-charging trailer braking systems.

BRIEF DESCRIPTION OF THE DRAWINGS

The present invention will now be described, by way of example, with reference to the accompanying drawings in which.

DETAILED DESCRIPTION OF THE DRAWINGS

The system of the present invention uses a signal associated with a towing vehicle brake to brake a trailer being pulled by the vehicle. The system monitors the wheel speed of the trailer to apply a desired amount of braking, while the anti-lock feature of the braking system reduces the tendency of the tires of the trailer to skid under braking. The system stores power so that if more electric power is required for the braking process than is available through the standard seven-pin trailer connections, such additional electric power is readily available. The system also maintains a positive emergency braking condition without requiring a constant supply of electricity and automatically engages the braking system in the event the trailer becomes inadvertently disengaged from the tractor.

Figure 1:
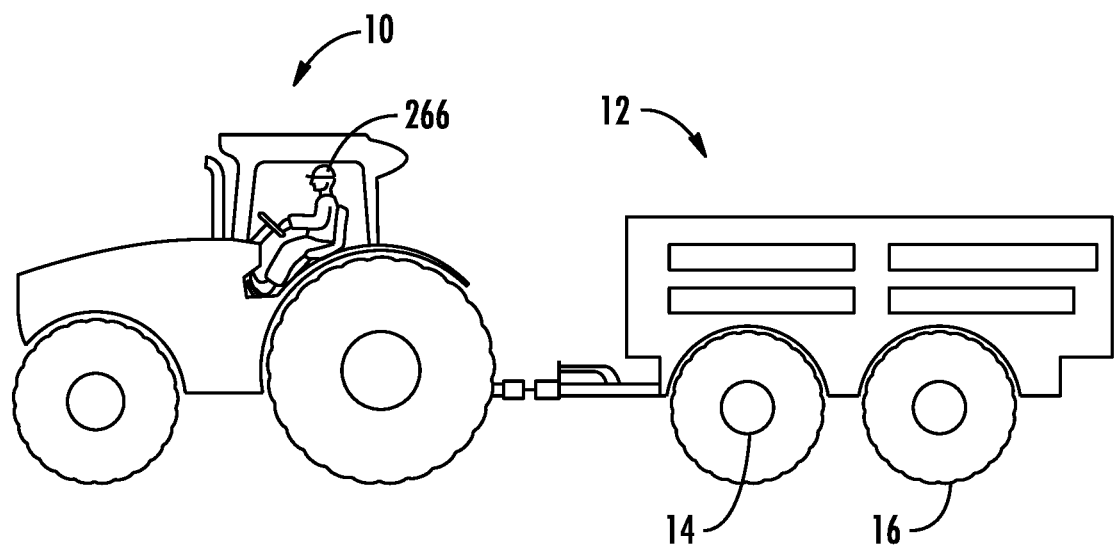
FIG. 1 illustrates a side perspective view of a tractor and trailer equipped with the braking system in accordance with one embodiment.
Figure 2:
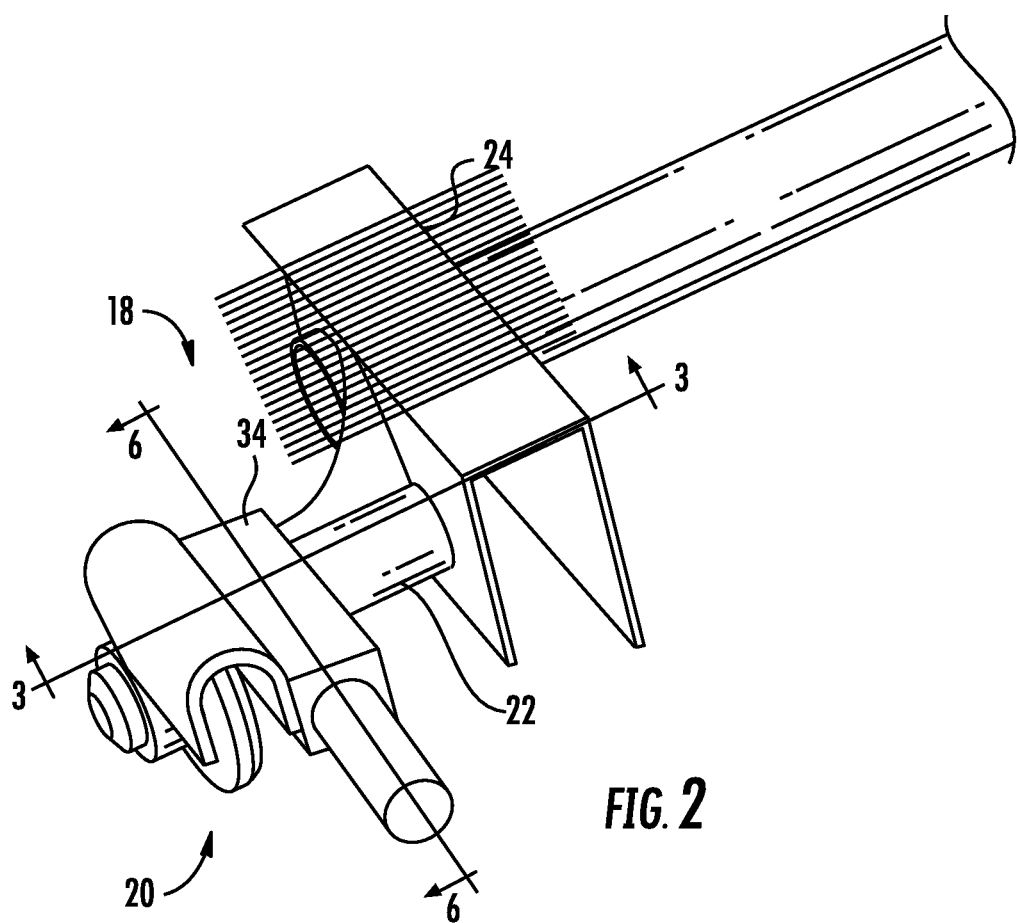
FIG. 2 illustrates a perspective view of the brake application assembly in accordance with one embodiment.

As shown in FIG. 1, a powered wheeled vehicle, such as a tractor (10), is shown mechanically and releasably coupled to a trailer (12) having a plurality of wheels (14) and tires (16) in a manner such as that known in the art. The tractor (10) and trailer (12) are part of a braking system (18) having a brake application assembly (20) such as that shown in FIG. 2. (FIGS. 1-2, and 5-6). While only a single brake application assembly (20) will be shown and described, it should be noted that any desired number of brake application assemblies (20) may be provided for any desired number of wheels (14) on the trailer (12). As shown in FIGS. 1-2, the wheel (14) is coupled to an axle (22) of the trailer (12), which in turn is coupled to a frame (24) of the trailer (12) in a manner such as that known in the art.

Figure 3:
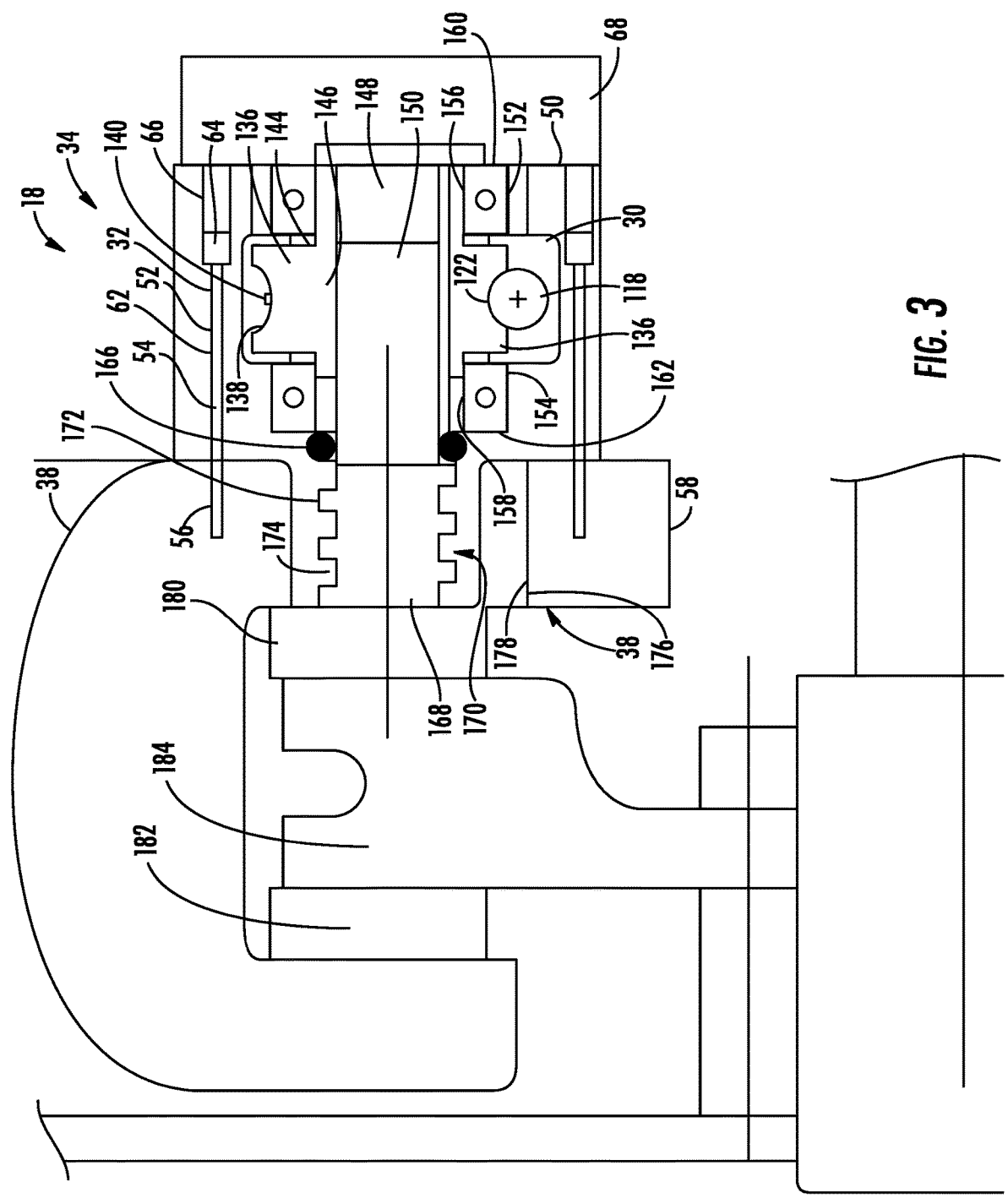
FIG. 3 illustrates a side elevation, in cross section, of the brake application assembly of FIG. 2, taken along lines 3-3 of FIG. 2.
Figure 4:
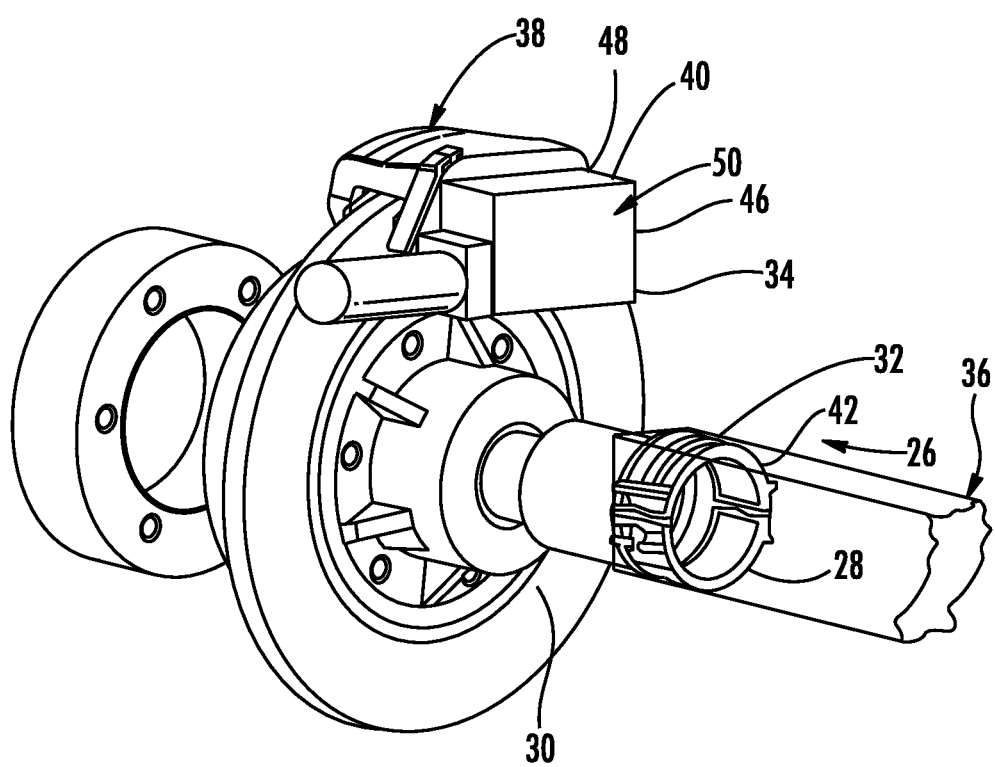
FIG. 4 illustrates a perspective view of the gearbox coupled to the caliper assembly of the trailer brake in accordance with one embodiment.
Figure 5:
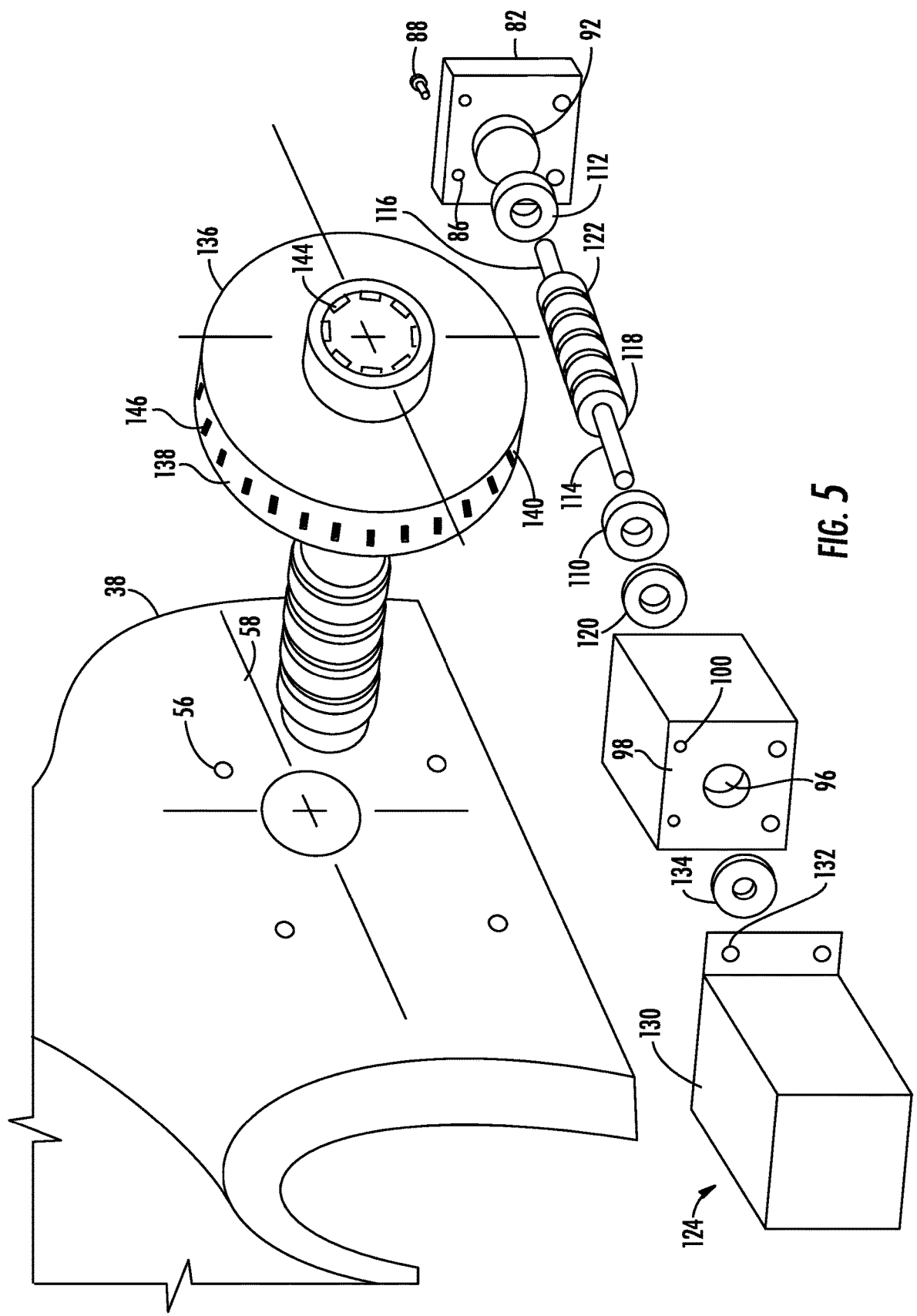
FIG. 5 illustrates an exploded view of the brake application assembly without the gearbox in accordance with one embodiment.
Figure 8:
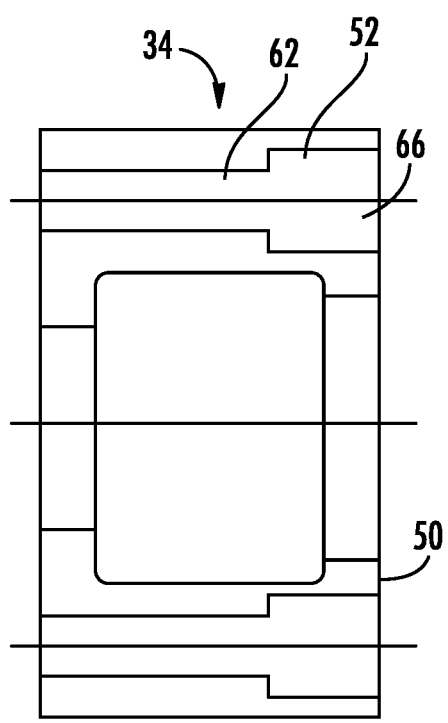
FIG. 8 illustrates front elevation, in cross-section, of the gearbox of FIG. 10, taken along lines 8-8 of FIG. 10.
Figure 9:
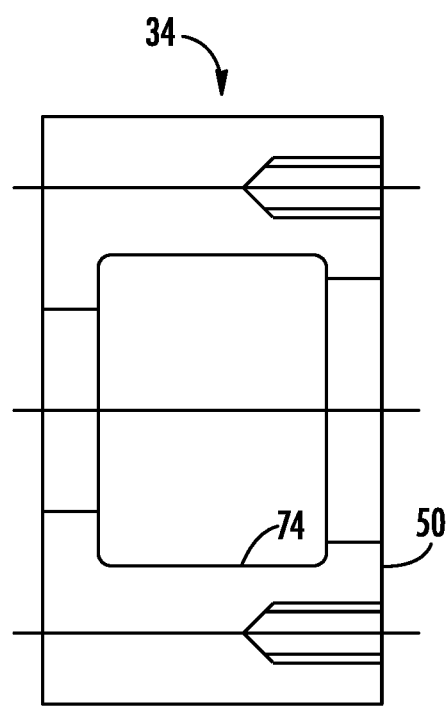
FIG. 9 illustrates top elevation, in cross-section, of the gearbox of FIG. 10, taken along lines 9-9 of FIG. 10.

As shown in FIGS. 2-3, a gearbox (34) is secured adjacent to the disc brake caliper assembly (38) described in more detail below. As shown in FIGS. 2-3 and 8-10, the gearbox (34) is constructed of cast iron or similar material and is provided with a top (40), a bottom (42), a front (44), a back (46), an exterior side (48), and an interior side (50). The sides (40-50) of the gearbox are preferably cast as one piece to form the gearbox (34), but the gearbox (34) may be machined from a block or 3D printed if desired. The interior side (48) of the gearbox (34) is provided with four smooth bore machined holes (52) configured to receive bolts (54) that secure into threaded holes (56) provided in a housing (58) of the disc brake caliper assembly (38). As shown in FIGS. 5 and 8, the four machined holes (52) are stepped from a small diameter hole (62) sized to accommodate the shank (32) of the bolts (54) to a large diameter hole (66), larger than the diameter of the heads (64) of the bolts (54). This allows the heads (64) of the bolts (54) to be completely contained with in the machined holes (52), to allow a gearbox cover (68) to fit flush over the interior side (50) of the gearbox (34) when the gearbox (34) is secured to the housing (58) of the disc brake caliper assembly (38) by the bolts (54).

As shown in FIGS. 2-3 and 8-10, a gearbox cover (68) is provided with four holes (70) to accommodate four threaded bolts (72) inserted through the holes (70) and threadably engaged with four threaded holes (74) provided on the interior side (50) of the gearbox (34). The bolts (72) may be removed to remove the gearbox cover (68) and allow access into the interior (76) of the gearbox (34) through a large circular opening (78) provided on the interior side (50) of the gearbox (34). The gearbox cover (68) is preferably constructed of cast iron or steel and secured in a manner so as to retain gear lubricant (30) within the gearbox (34) and to prevent the ingress of contaminants, such as dirt or moisture into the gearbox (34). A flexible gasket (not shown) or a suitable formable gasket material is inserted between the gearbox (34) and gearbox cover (68) to prevent contaminants from entering the gearbox (34) and to retain the gear lubricant (30).

Cylindrical worm screw openings (80) and (84) are provided in the back (46) and front (44) of the gearbox (34) respectively. An end cap (82) is provided over one end of the opening (80). The end cap (82) is a steel plate having holes (86) that allow the end cap (82) to be secured to the gearbox (34) over the worm screw opening (80) by a plurality of fasteners, such as bolts (88) that screw into mating engagement with threaded holes (90) provided in the back (46) of the gearbox (34). The end cap (82) is provided with a boss (92) which, in the preferred embodiment, is a flat cylindrical machined surface integrally formed as part of the end cap (82). Alternatively, the boss (92) may be cast as an integral part of the end cap (82). The boss (82) is sized to fit snugly within the worm screw opening (80). A flexible gasket (not shown) or a suitable formable gasket material is inserted between the gearbox (34) and the end cap (82) to prevent contaminants from entering the gearbox (34) and to retain the gear lubricant (30).

Figure 7:
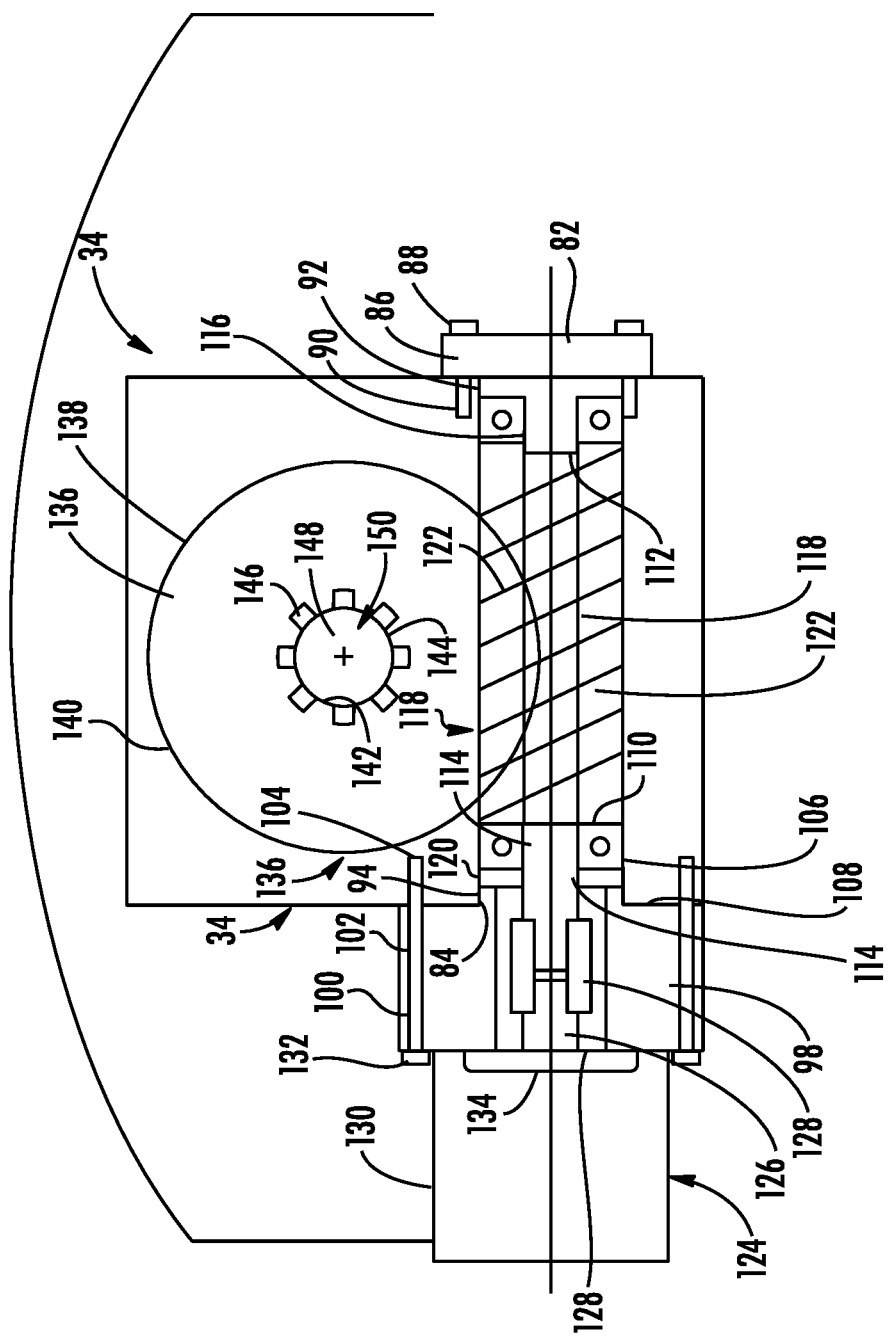
FIG. 7 illustrates a side elevation, in cross-section, of the brake application gearbox of FIG. 2, taken along lines 6-6 of FIG. 2.

Provided over the cylindrical worm screw opening (84) on the opposite side of the gearbox (34) is a front cap (98). FIG. 7. The front cap (98) is also provided with a boss (94) which, in the preferred embodiment, is a flat cylindrical integrally formed as part of the front cap (98). The boss (94) is sized to fit snugly within the worm screw opening (84) on the opposite side of the gearbox (34). A hole (96) extends through the boss (94) and all of the way through the front cap (98). The front cap (98) is a steel plate or cast iron unit having holes (100) that allow the front cap (98) to be secured to the gearbox (34) over the worm screw opening (84) by a plurality of fasteners, such as bolts (102) that screw into mating engagement with threaded holes (104) provided in the gearbox (34).

Figure 6:
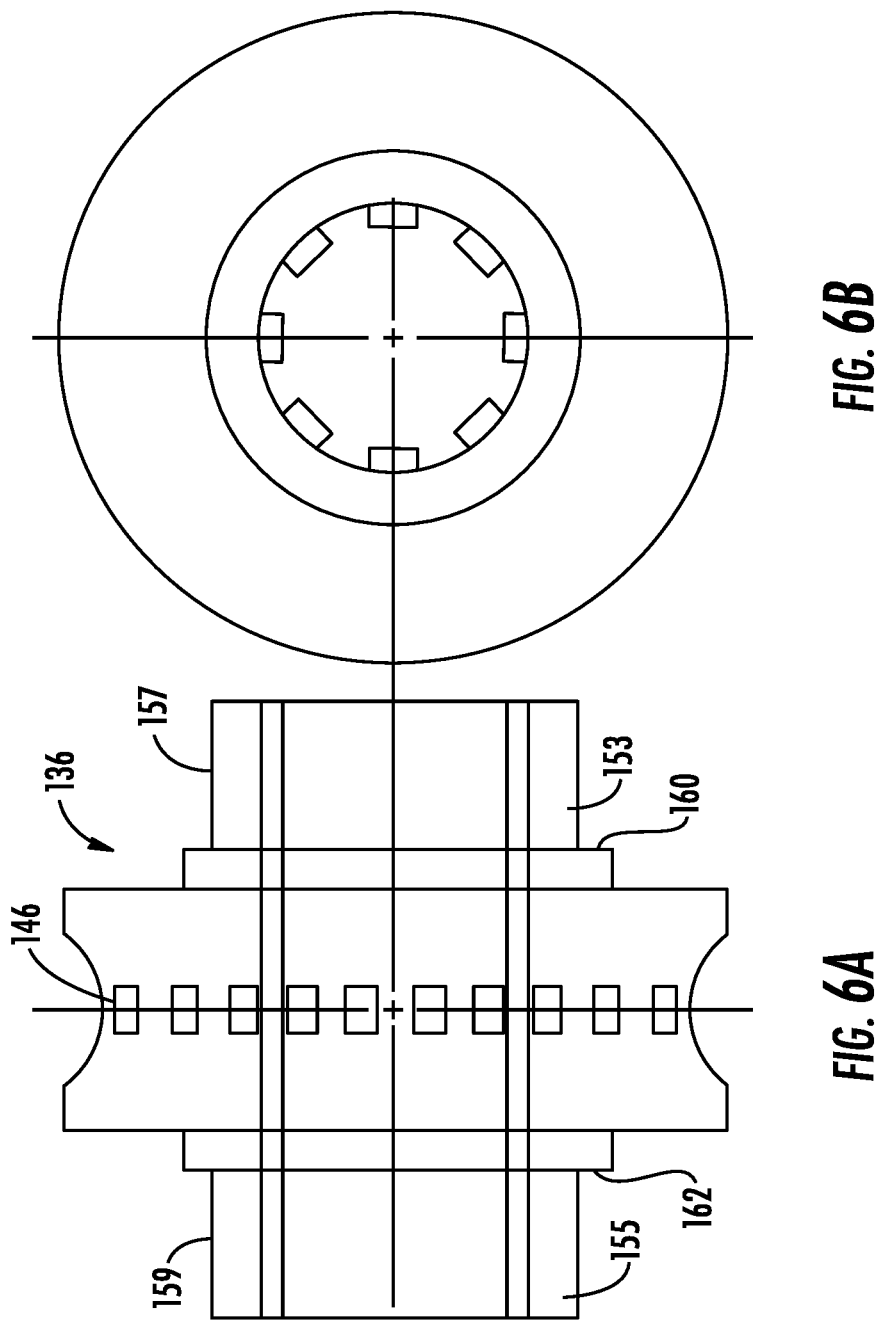
FIG. 6A illustrates a front elevation of the worm gear of FIG. 5.
FIG. 6B illustrates a side elevation of the worm gear of FIG. 5.
Figure 10:
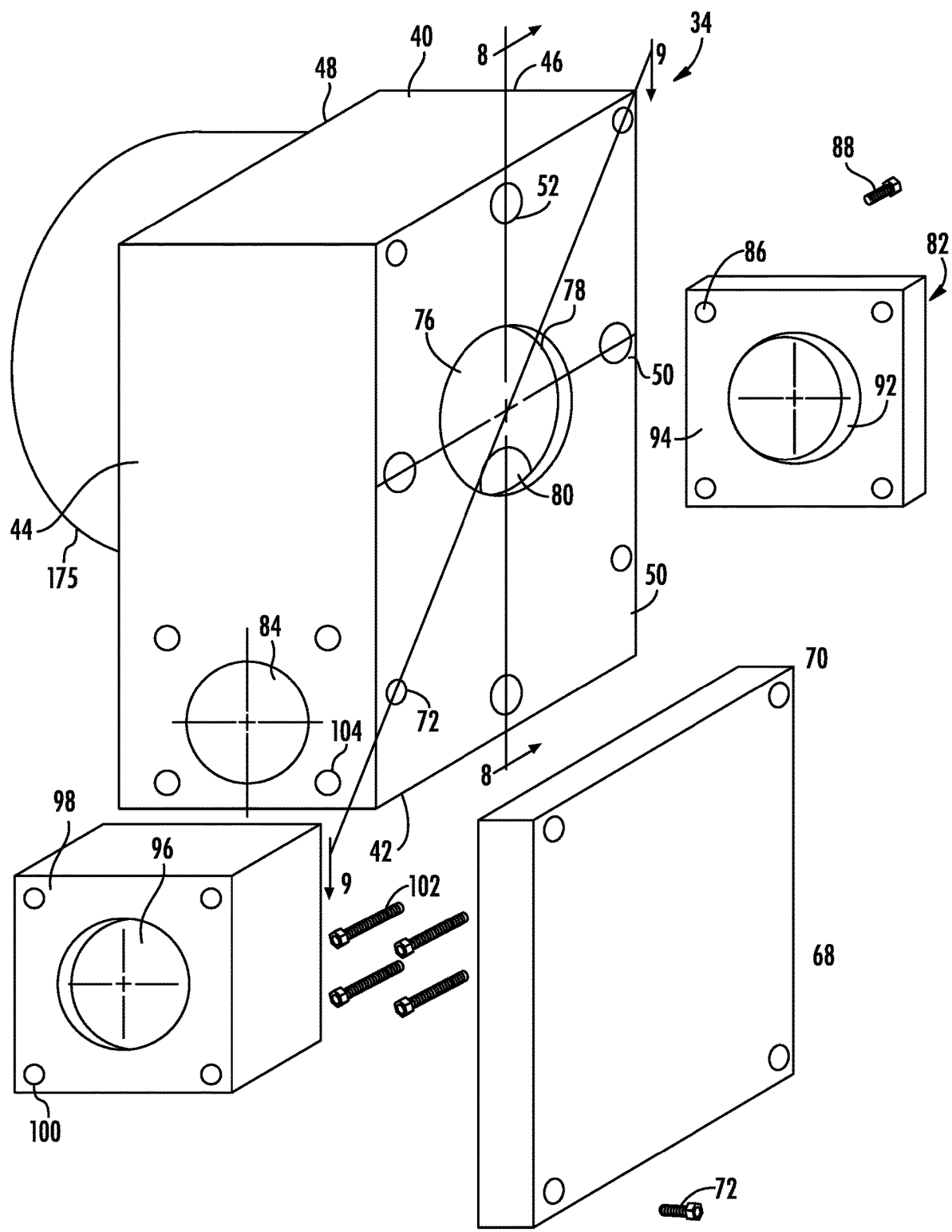
FIG. 10 illustrates an exploded view in partial phantom of the gearbox in accordance with one embodiment.

As shown in FIGS. 5 and 7, a worm screw (118) is provided having screw threads (122) in the middle, and a forward shaft end (114) and a rearward shaft end (116) on either end. A first ball bearing assembly (110) is provided over the forward shaft end (114) and a second ball bearing assembly (112) is provided over the rearward shaft end (116). The bearing assemblies (110) and (112) are each provided with an outer diameter sized to fit snugly against the interior walls of the gearbox (34) around the worm screw openings (80) and (84). The bearing assembly (110) is preferably of a thickness sufficient to fit snugly between the boss (94) of the front cap (98) and the screw threads (122). (FIGS. 5 and 7). Similarly, the bearing assembly (112) is preferably of a thickness sufficient to fit snugly between the boss (92) of the end cap (82) and the screw threads (122). Preferably, the bearing assemblies (110) and (112) are slightly thinner than required for a snug fit and an annular metal shim (120), such as those known in the art, may be provided around the forward shaft (114), between the boss (94) of the front cap (98) and the ball bearing assembly (110) to properly adjust the screw threads (122) of the worm screw (118) with gear teeth (140) of a worm gear (136) so that in repeated reversal of the braking effort there is no looseness in the mechanism. (FIGS. 5-6 and 10).

As shown in FIG. 7, the hole (96) extends all of the way through the front cap (98) to accommodate a drive shaft coupler (128), such as those known in the art, to couple the forward shaft (114) with a drive shaft (126) of an electric motor (124). The motor (124) is preferably an electric rotational drive motor, such as a brushless permanent magnet DC motor provided with the drive shaft (126). The drive motor (124) may be of any desired type. In a typical embodiment, brushless permanent magnet DC drive motor (124) is used. The drive motor (124) is provided with a housing (130) having a brushless permanent magnet direct current (DC) motor that runs on 12V DC with a full load current of 30 amps, 20 inch-pounds (in-lbs) output torque at 5000 revolutions per min (rpm). Any desired drive motor (124) may be used, preferably having a full load current between 1 and 50 amps, more preferably between 20 and 40 amps, and most preferably 30 amps with an output torque of up to 40 in-lbs. The drive motor (124) is preferably rated at 5,000 rpm for between 10 and 70 in-lbs torque, and more preferably between 20 and 30 in-lbs torque, and most preferably 20 in-lbs of torque. The drive motor (124) is preferably rated for operation up to 10,000 rpm, and more preferably up to 5000 rpm.

The housing (130) of the drive motor (124) is provided with four mounting holes (132) to attach the motor to the front cap (98). (FIGS. 5 and 7). The mounting bolts (102) for the front cap pass through the mounting holes (132) of the drive motor (124) before passing through the holes (100) in the front cap (98) and being screwed into mating engagement with threaded holes (104) provided in the gearbox (34), to secure the drive motor (124) and front cap (98) assembly to the gearbox (34). The drive shaft (126) of the drive motor (124) passes through the hole (96) in the front cap (98) to drive the worm screw (118). An annular oil seal (134) is provided between the drive motor (124) and the front cap (98). The worm gear (136), such as those known in the art, is provided on its outer race (138) with gear teeth (140) that fit into mating engagement with the threads (122) of the worm screw (118). As shown in FIGS. 3 and 5-6, the worm gear (136) is positioned within the gearbox (34) in drivable engagement with the threads (122) of the worm screw (118). The worm gear (136) is annular and provided along its inner race (142) with a plurality of internal splines (144). The internal splines (144) are of a depth and width configured to slidably engage external splines (146) provided along a first, outer, end (148) of a brake actuator (150). Although the external splines (146) can be of any desired construction, there are preferably between 1-10 straight sided external splines (146), more preferably between 2-8, and evenly machined around the brake actuator (150) as defined by machinery standards in a manner such as those known in the art. The brake actuator (150) and external splines (146) are preferably constructed of steel.

As shown in FIGS. 3 and 5-7, the worm gear (136) is held in place by two annular bearings (152) and (154). The bearings (152) and (154) are provided with smooth inner races (156) and (158). The worm gear (136) is integrally machined with two hollow shafts (153) and (155), with each shaft (153) and (155) defining a respective outer race (157) and (159). The worm gear (136) is also integrally machined with two shoulders (160) and (162), one on either side of the worm gear (136). The inner-races (156) and (158) of the bearings (152) and (154) are interference fit onto the outer races (157) and (159) of the shafts (153) and (155) so that the bearings (152) and (154) are in contact with their respective shoulders (160) and (162), The bearings (152) and (154) being in contact with their respective shoulders (160) and (162) maintain the worm gear (136) in place, drivably coupled to the worm screw (118).

A second end (170) of the brake actuator (150) is provided with threads (172) that fit into threaded engagement with threads (174) provided on the interior of a cylindrical extension (176) of the gearbox (34) that fits into a cylindrical opening (178) in the caliper assembly housing (58). An O-ring (166) is provided around an unsplined, unthreaded portion of the brake actuator (150), between the annular bearing (154) and the caliper assembly housing (58). A pushing end (168) of the brake actuator (150) is configured, so upon rotation of the brake actuator (150), pushing end (168) moves into and out of contact with one of the brake pads (180) and (182) of the caliper assembly (38).

Once the brake application assembly (20) is installed and adjusted as desired, actuation of the drive motor (124) turns the worm screw (118), which turns the worm gear (136). The worm gear (136) turns the brake actuator (150) that pushes against the brake pad (180), causing the brake pads (180) and (182) of the caliper assembly (38) to engage a rotor (184), such as those known in the art, and slow the wheel (14) of the trailer (12). When it is desired to reduce braking, the drive motor (124) is actuated to turn the worm screw (118) in reverse, which results in the brake actuator (150) turning in reverse and reducing the force of the brake actuator (150) on the brake pads (180) and (182). The floating disc brake caliper assembly (38) with lower force on the rotor (184) allows the wheel (14) of the trailer (12) to turn more freely resulting in less braking force.

Figure 11:
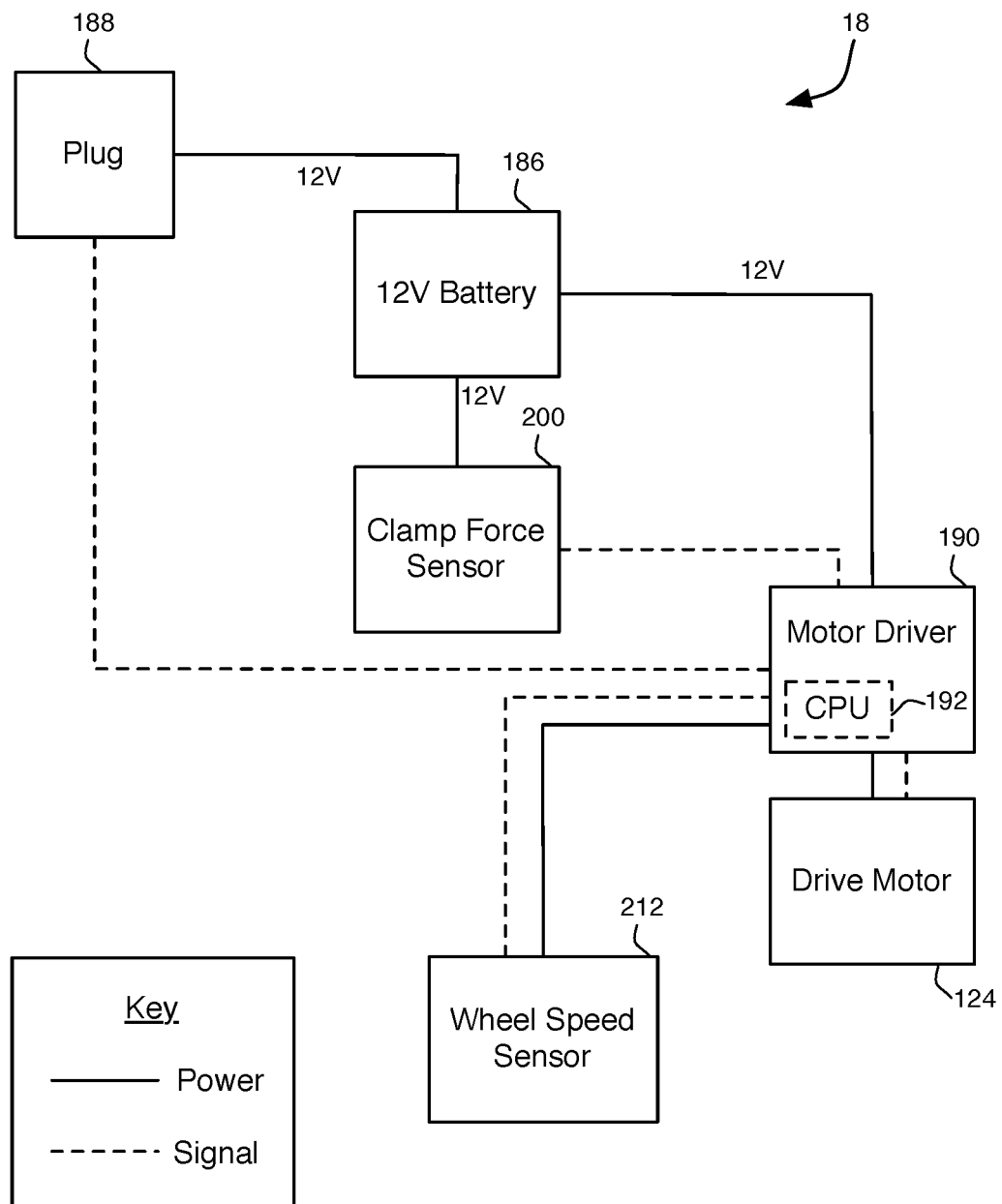
FIG. 11 illustrates a block diagram of the system architecture of the braking system in accordance with one embodiment.

As shown in FIG. 11, the braking system (18) is provided with an electrical power storage system, such as a 12V power source (186). While the power source (186) may be a capacitor, or any desired power source, in one embodiment of the invention, the power source (186) is a battery. Power supplied by the 12V/Aux power from the tractor's seven-pin connector plug (188) is used to recharge the power source (186). The power source (186) is coupled to a power controller (190), which in the preferred embodiment is a MDC2230 brushed motor controller supplied by Roboteq, Inc. of Scottsdale, Ariz., USA. The power controller (190) is provided with a computer, such as a central processing unit (CPU) (192) and a program storage unit, such as computer memory incorporated into the power controller (190) and readable by the CPU (192) to execute one or more instructions as explained in more detail below. The power controller (190) is capable of converting power from the power source (186) into either a low voltage 3.3V output for the wheel speed sensor (212), or a high voltage (12V) and high current output for the brake application assembly (20). The power controller (190) is coupled to the drive motor (124) to provide variable power to the drive motor (124) based on the current demand and to receive input from the sensor on the drive motor (124) which provides the power controller (190) with information as to the current position of the worm screw (118). The CPU (192) is preferably integrated into the power controller (190), but may, alternatively, be a stand alone CPU, or be a CPU incorporated into a different component of the braking system (18).

The CPU (192) is coupled to various sensors, including a brake force sensor (200) that in one embodiment is a TD1000 Pressure Transducer supplied by Transducers Direct of Cincinnati, Ohio. The brake force sensor (200) is preferably coupled into engagement with a prior art brake line hydraulic pressure testing port on the tractor (10). (FIGS. 1 and 7). If the tractor (10) is already provided with plug capable of outputting the hydraulic pressure in the brake line of the tractor (10), the braking system (18) can be provided with an adapter to fit into engagement with the plug instead of, or in addition to, the brake force sensor (200). Monitoring the hydraulic pressure in the brake line of the tractor (10) is preferred, since it provides information not only that the brakes of the tractor (10) are being applied, but also the level of force with which they are being applied. This allows the braking system (18) to vary the pressure applied to the disc brake caliper assembly (38) associated with the trailer (12) to apply more braking force on the trailer when there is more braking force on the tractor (12) and to apply less braking force on the trailer when there is less braking force on the tractor (12). (FIGS. 1-2 and 11). Alternatively, if it is not desired to brake the trailer (12) as a function of the amount of braking force applied to the tractor (10), the braking system (18) can be coupled directly to the vehicle brake, which in one embodiment is the brake pedal of the tractor (10), or to the brake light signal line of the tractor's seven-pin connector plug (188). If desired, the braking system (18) can receive input from a standard ISO 11783 (otherwise known as an ISOBUS) communication protocol device or other communication device known in the art.

A wheel speed sensor (212), which in one embodiment is a SNG-QPLA-000 Hall Effect Sensor supplied by Honeywell, International, Inc., is coupled to the CPU (192) and monitors the speed of the wheel (14). In addition to controlling standard braking of the trailer (12) through the drive motor (124), the CPU (192) also functions as a braking release system and an anti-lock braking system (ABS) (228).

Figure 12:
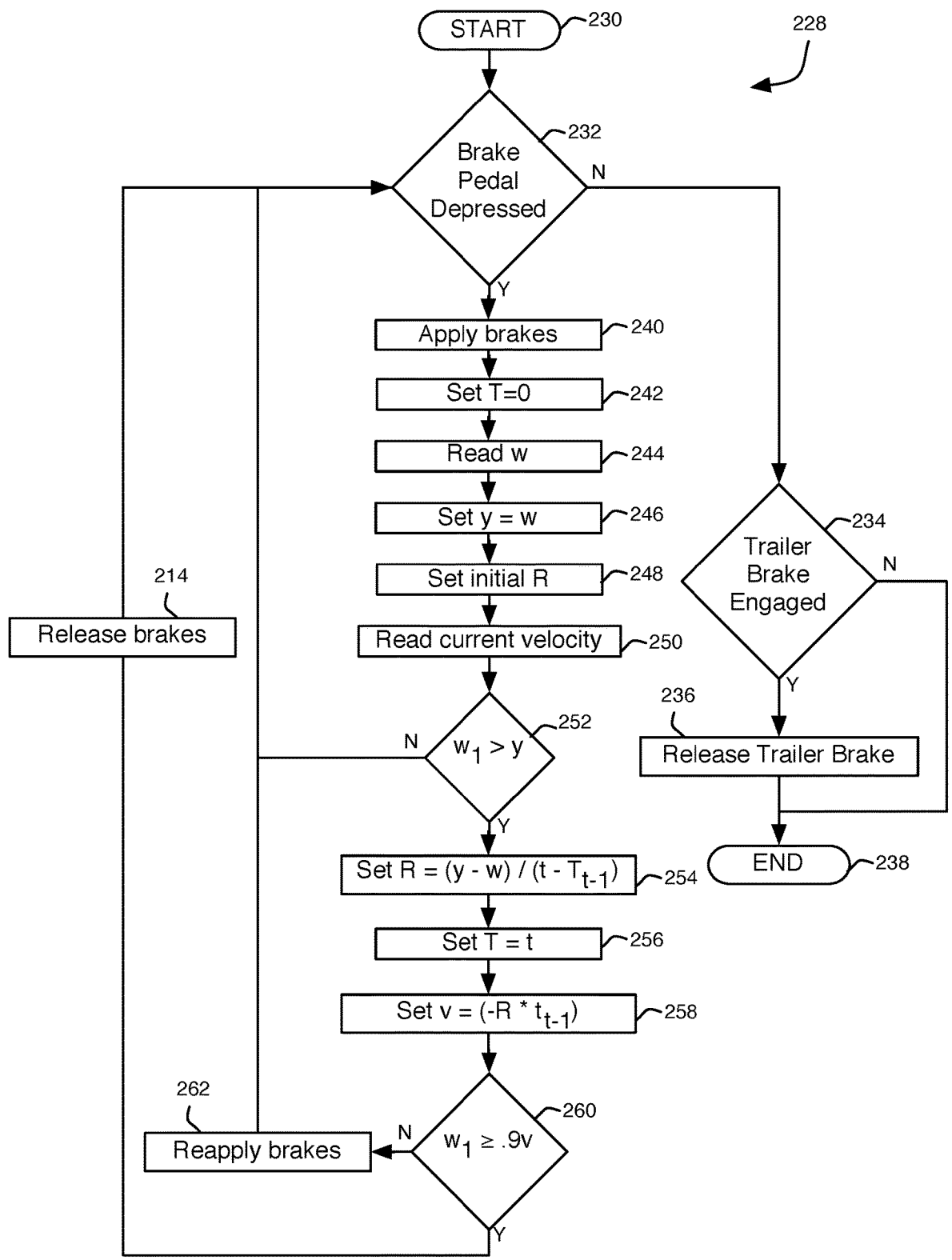
FIG. 12 illustrates a flow chart of the braking process of the braking system in accordance with one embodiment.

FIG. 12 is a flow diagram showing the steps typically performed by the braking system (18) for engaging the ABS (228). (FIGS. 2, 7-8, and 12). Engagement of the ABS (228) starts (230) with the CPU (192) determining (232) if the tractor (10) is braking by receiving a brake light signal from the tractor's seven-pin connector plug (188). The CPU (192) then receives from the brake force sensor (200), a signal reflecting the degree to which, if any, braking force is being applied to the tractor (10) by application of the tractor's hydraulic braking system. If the brake force sensor (200) is not sending a signal that a braking force is being applied to the tractor (10) by application of the tractor's hydraulic braking system, the process determines (234) if the drive motor (124) is engaging the disc brake caliper assembly (38) to brake the trailer (12). If the CPU (192) does not receive both the brake light signal from the tractor's seven-pin connector plug (188) and a signal from the force sensor (200) that braking force is being applied to the tractor (10) by application of the tractor's hydraulic braking system, the CPU (192) stops braking the trailer (12). If the drive motor (124) is engaging the disc brake caliper assembly (38) to brake the trailer (12) at that time, the CPU (192) signals (236) the power controller (190) to reverse the drive motor (124) and release the disc brake caliper assembly (38). The process then terminates (238). If the drive motor (124) is not engaging the disc brake caliper assembly (38) to brake the trailer (12), the process simply terminates (238).

If the CPU (192) does receive both the brake light signal from the tractor's seven-pin connector plug (188) and a signal from the brake force sensor (200) that braking force is being applied to the tractor (10) by application of the tractor's hydraulic braking system, the CPU (192) signals the power controller (190) to actuate the drive motor (124) to apply braking force (240) to the rotor (184) via the disc brake caliper assembly (38). The CPU (192) runs an algorithm that initializes a time signal (t) and sets (242) a time (T) to zero. The CPU (192) uses the algorithm to determine (244) an initial rotational velocity (w) of the wheel (14) via inputs from the wheel speed sensor (212) and sets (246) an initial estimated trailer velocity (y) to the initial rotational velocity (w) of the wheel (14). The CPU (192) sets (248) an initial gain value (R), and reads (250) the current rotational velocity ($w_1$) of the wheel (14) at $T_{t-1}$. The CPU (192) compares (252) the estimated trailer velocity (y) with the current rotational velocity ($w_1$) of the wheel (14). If ($w_1$) exceeds (y), the CPU (192) sets (254) R to $(y-w)/(t-T_{t-1})$. If that calculation results in a change in R, the CPU (192) sets (256) T to t. The CPU (192) sets (258) the estimated velocity of the trailer where (v) equals $(-R*t_{t-1})+y$. If the CPU (192) determines (260) that the current rotational velocity ($w_1$) of the wheel (14) is at or above 90% of the estimated velocity (v) of the trailer, the CPU signals the power controller (190) to reactuate (262) the drive motor (124) to apply additional braking force, or alternatively, the same braking force, to the rotor (184) via the disc brake caliper assembly (38). The process then returns to step (232) to determine if braking force is still being applied to the tractor (10) by application of the tractor's hydraulic braking system. If the CPU (192) determines (260) that the current rotational velocity ($w_1$) of the wheel (140) is below 90% of the estimated velocity (v) of the trailer, the CPU (192) signals the power controller (190) to reverse (264) the drive motor (124) to reduce braking force to the rotor (184) via the disc brake caliper assembly (38). The process then returns to step (232) to determine if braking force is still being applied to the tractor (10) by application of the tractor's hydraulic braking system. The CPU (192) continues as described above, applying and releasing the disc brake caliper assembly (38) up to several times per second until the process terminates (238). The CPU (192) can alternatively be programmed to actuate the ABS (228) if it determines (260) that the current rotational velocity ($w_1$) of the wheel (14) is below 50% or above 99% of the estimated velocity (v) of the trailer (12) or anywhere in between.

With the exception of the ABS functionality, the CPU (192) applies a braking force proportional to the braking force inputted to the CPU (192) when the tractor brake lights come on and brake light signal is conveyed through a female seven-pin connector plug (188) to the CPU (192). For simplicity, this will be referred to as the braking state. With the exception of the ABS functionality, the CPU (192) returns the brake pads (180) and (182) to a predetermined distance away from the rotor (184) when the brake light signal goes off. This will be referred to as the non-braking state. When the ABS functionality of the CPU (192) detects an irregularly steep deceleration of the trailer, CPU (192) will switch the braking system (18) into a non-braking state until wheel velocity returns to normal. This process may cause the rapid switching between braking and not braking associated with prior art ABS systems.

The CPU (192) relies on five inputs: the power in, the brake light on signal, the brake system pressure sensor, the current position sensor of the drive motor (124), and the wheel speed sensor (212). The output of the CPU (192) goes to the power controller (190) that outputs the required voltage to the drive motor (124). The CPU (192) can immediately switch its output from closed loop position tracking to no torque output to the disc brake caliper assemblies (38). This allows the CPU (192) to apply accurately proportioned force outputs, and accurately float the pads (180) and (182) a predetermined distance away from the brake rotor (184) when braking is not required.

When it is desired to actuate the parking brake feature of the braking system (18), the tractor operator (216) depresses the standard brake pedal (224) of the tractor (10) and turns the tractor (10) off while the tractor brake pedal (224) is still being depressed. When this happens, the CPU (192) receives a signal from the brake force sensor (200) that braking force is being applied to the tractor (10) by application of the tractor's hydraulic braking system and the CPU (192) signals the power controller (190) to actuate the drive motor (124) to apply braking force (190) to the rotor (184) via the disc brake caliper assembly (38). Then, when the tractor operator (216) turns the tractor (10) off, the CPU (192) receives input from the wheel speed sensor (212) that the wheels (14) of the trailer (12) are not turning, and that the braking system (18) is not receiving 12V/Aux power from the tractor's seven-pin connector plug (188). In this event, the CPU (192) takes no further action and leaves the drive motor (124) applying the same braking force (240) to the rotor (184) via the disc brake caliper assembly (38) that it did before the tractor (10) was turned off. Because braking pressure force in the braking system (18) is applied with a mechanical brake actuator (150), rather than a pneumatic or hydraulic system, no power is required for the drive motor (124) to maintain this braking force (240) indefinitely. The tractor operator (266) simply shuts the power off on the tractor with the standard brake pedal (224) depressed and the braking system (18) remains engaged. When the tractor operator (266) wants to resume operation the tractor operator (266) simply starts the tractor and steps on the standard brake pedal (224), causing the CPU (192) to receive a signal from the brake force sensor (200) that braking pressure has been applied to the tractor (10) by the operator (216). The operator then releases the standard brake pedal (224) and resumes operation. In response to the brake force sensor (200) sending a signal that braking pressure has been released on the tractor (10) by the operator (266), the CPU (192) signals the power controller (190) to actuate the drive motor (124) to release the braking force (190) to the rotor (184) via the disc brake caliper assembly (38).

In a similar manner, if the trailer (12) becomes inadvertently detached from the tractor (10) while in motion, the CPU (192) is programmed to actuate the drive motor (124) to apply braking force from the disc brake caliper assemblies (38) to the rotors (184). In one embodiment this automatic braking upon breakaway functionality is triggered if the female seven-pin connector plug (188) located on the tractor (10) becomes detached from the male seven-pin connector plug located on the trailer (12). In this event the CPU (192) of the braking system (18) is receiving input from the wheel speed sensor (212) that the wheels (14) of the trailer (12) are turning, but the braking system (18) is not receiving 12V/Aux power from the tractor's seven-pin connector plug (188). Once this condition is met, the CPU (192) signals the power controller (190) to actuate the drive motor (124) to apply braking force to the rotor (184) via the disc brake caliper assembly (38). The braking upon breakaway functionality can be set to either fully apply the disc brake caliper assemblies (38) until the trailer (12) stops, or employ the ABS system described above to stop the trailer without skidding.

Although the invention has been described with respect to a preferred embodiment thereof, it is to be understood that it is not to be so limited since changes and modifications can be made therein which are within the full, intended scope of this invention as defined by the appended claims.

What is claimed is:

1. A braking system comprising:
    (a) a powered wheeled vehicle;
    (b) a trailer releasably coupled to the vehicle, wherein the trailer comprises:
        i an axle; and
        ii a wheel coupled to the axle;
    (c) a brake engagement system comprising:
        i a motor;
        ii a worm screw drivably coupled to the motor;
        iii a worm gear drivably coupled to the worm screw;
        iv a shaft drivably coupled to the worm gear, wherein the shaft is extensible from a first position to a second position;
    (d) a brake rotor; and
    (e) a brake pad provided in sufficient proximity to the shaft to allow the shaft to force the brake pad into contact with the brake rotor when the shaft is in the second position and to allow the brake pad to move out of contact with the brake rotor when the shaft is in the first position.

2. The braking system of claim 1, further comprising a supplemental brake pad, wherein the brake rotor is positioned between the brake pad and the supplemental brake pad.

3. The braking system of claim 1, further comprising a wheel speed sensor coupled to the wheel.

4. The braking system of claim 3, wherein the rotor is coupled to the gear.

5. The braking system of claim 3, further comprising a braking release system coupled to the wheel speed sensor and to the motor.

6. The braking system of claim 5, wherein the braking release system is configured to actuate the motor in response to the wheel speed sensor detecting a predetermined change in the speed of the wheel.

7. The braking system of claim 1, further comprising an antilock braking System coupled to the motor.

8. The braking system of claim 7, wherein the antilock braking system is configured to actuate the motor in response to the antilock braking system detecting a predetermined locking of the wheel under braking.

9. The braking system of claim 1, further comprising an electrical power storage system provided on the trailer and coupled to the motor.

10. The braking system of claim 9, wherein the electrical power storage system is an electrical capacitor.

11. The braking system of claim 1, further comprising a brake pedal located on the vehicle and coupled to the motor in a manner such that depression of the brake pedal actuates the motor.

12. The braking system of claim 11, further comprising a vehicle brake, wherein the motor is configured in a manner such that depression of the brake pedal causes the motor to exert sufficient force on the shaft to slow the trailer sufficiently so that the trailer exerts a braking force on the towing vehicle.

13. The braking system of claim 11, further comprising a computer provided on the trailer and a program storage medium readable by the computer and tangibly embodying one or more instructions executable by the computer to perform a method for braking the trailer, the method comprising:
    (a) receiving input associated with depression of the brake pedal; and
    (b) actuating the motor in response to receipt of the input.

14. The braking system of claim 13, wherein the input associated with depression of the brake pedal is received from a seven-pin connector pit g provided on the vehicle.

15. A braking system comprising:
    (a) a powered wheeled vehicle;
    (b) a trailer releasably coupled to the vehicle, wherein the trailer comprises:
        i an axle; and
        ii a wheel coupled to the axle;
    (c) a brake engagement system comprising:
        i a housing;
        ii a motor;
        iii a worm screw provided within the housing and drivably coupled to the motor;
        iv a worm gear provided within the housing and drivably coupled to the worm screw;
        v a shaft provided at least partially within the housing and drivably coupled to the worm gear, wherein the shaft is extensible from a first position to a second position;
    (d) a brake rotor; and (e) a brake pad provided in sufficient proximity to the shaft to allow the shaft to force the brake pad into contact with the brake rotor when the shaft is in the second position and to allow the brake pad to move out of contact with the brake rotor when the shaft is in the first position.

16. A method for braking a trailer comprising:
(a) providing a powered wheeled vehicle having a brake pedal;
(b) releasably coupling a trailer to the vehicle, wherein the trailer comprises:
  i an axle; and
  ii a wheel coupled to the axle;
(c) securing a brake engagement system to the trailer, the brake engagement system comprising:
  i a motor;
  ii a worm screw drivably coupled to the motor;
  iii a worm gear drivably coupled to the worm screw;
  iv a shaft drivably coupled to the worm gear, wherein the shaft is extensible from a first position to a second position;
(d) securing a brake rotor to the trailer; and
(e) securing a brake pad to the trailer in sufficient proximity to the shaft to allow the shaft to force the brake pad into contact with the brake rotor when the shaft is in the second position and to allow the brake pad to move out of contact with the brake rotor when the shaft is in the first position;
(f) securing a wheel speed sensor to the trailer;
(g) depressing the brake pedal;
(h) activating the motor in response to the brake pedal being depressed;
(i) driving the worm screw with the motor;
(j) driving the worm gear with the worm screw sufficiently to drive the shaft sufficiently to push the brake pad toward the brake rotor sufficiently to slow the trailer;
(k) obtaining an output from the wheel speed sensor; and
(l) driving the brake pad away from the brake rotor in response to obtaining input from the wheel speed sensor sufficiently to slow the trailer.

17. The method for braking a trailer of claim 16, wherein depression of the brake pedal generates brake pressure and further comprising activating the motor in proportion to the brake pressure.

18. The method for braking a trailer of claim 17, further comprising converting changes in the brake pressure into electrical signals.

19. The method for braking a trailer of claim 18, further comprising converting changes in the brake pressure into electrical signals with a pressure transducer.

* * * * *

UNITED STATES PATENT AND TRADEMARK OFFICE
CERTIFICATE OF CORRECTION

| | | |
|---|---|---|
| PATENT NO. | : 11,267,446 B2 | Page 1 of 1 |
| APPLICATION NO. | : 16/672813 | |
| DATED | : March 8, 2022 | |
| INVENTOR(S) | : Richard W. Job | |

It is certified that error appears in the above-identified patent and that said Letters Patent is hereby corrected as shown below:

In the Claims

Column 10: Line 49: In Claim 14, please delete "pit g" and insert therefor --plug--.

Signed and Sealed this
Twentieth Day of September, 2022

Katherine Kelly Vidal
*Director of the United States Patent and Trademark Office*